May 9, 1950  C. S. JEWETT ET AL  2,507,018
ANTIICING SCREEN
Filed May 8, 1948  2 Sheets-Sheet 1
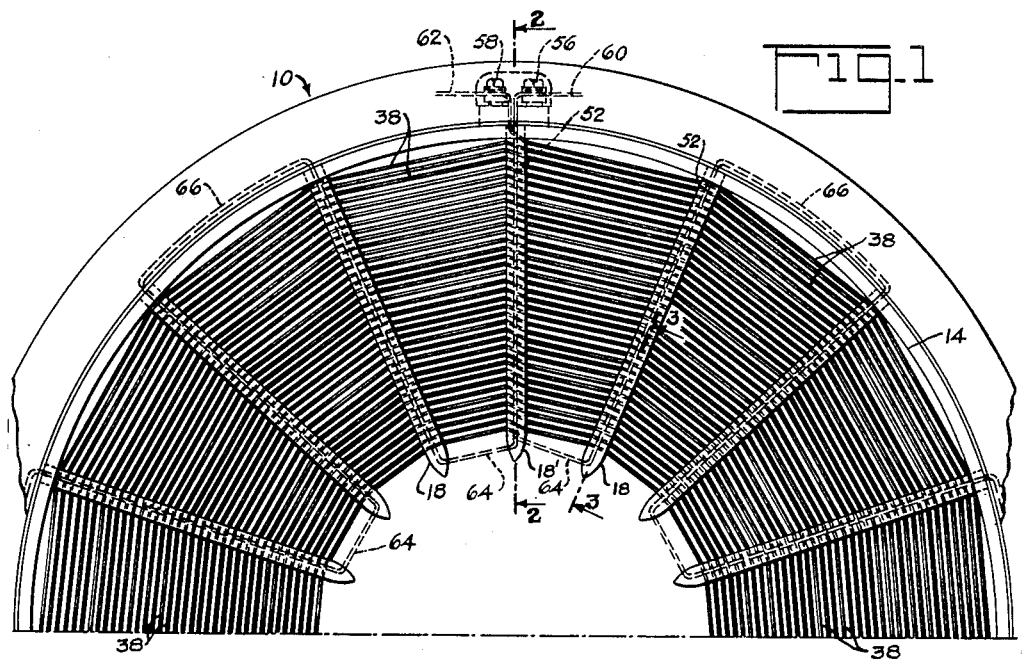
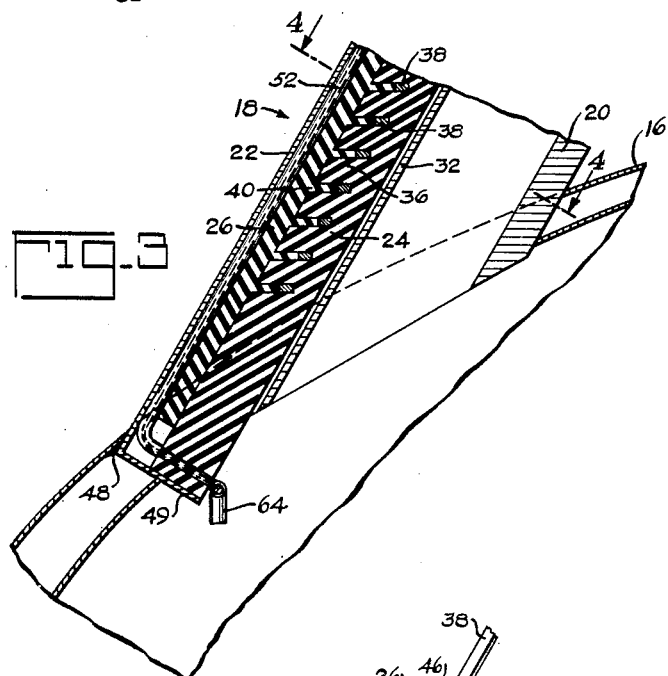
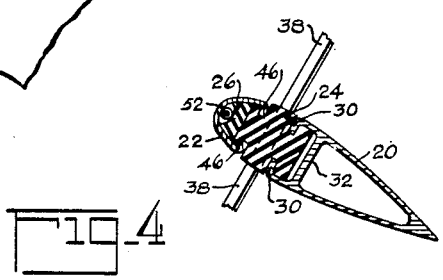
INVENTORS
CHARLES S. JEWETT.
ROBERT A. LOOS.
EUGENE A. MEHNERT.
BY
ATTORNEY

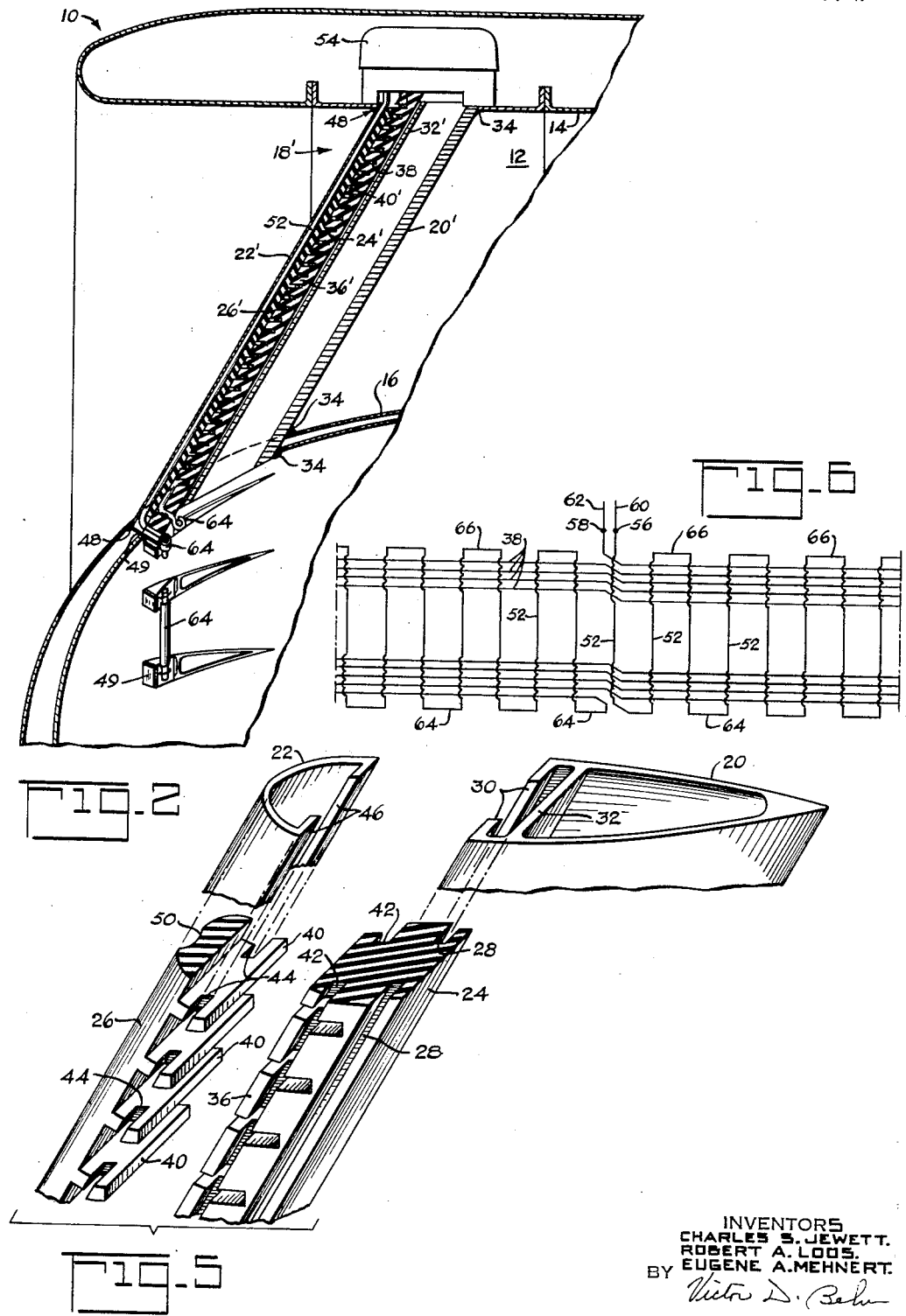

Patented May 9, 1950

2,507,018

UNITED STATES PATENT OFFICE 2,507,018

ANTIICING SCREEN

Charles S. Jewett, Ramsey, Robert A. Loos, Packanack Lake, and Eugene A. Mehnert, Park Ridge, N. J., assignors to Wright Aeronautical Corporation, a corporation of New York Application May 8, 1948, Serial No. 25,956

8 Claims. (Cl. 219—19)

This invention relates to screens for fluid ducts and is particularly directed to a screen for the air intake duct of an engine for preventing the entrance of foreign objects into said duct, said screen including means for heating its parts to prevent the formation of ice thereon. The invention has been designed in connection with the annular air entrance duct of a gas turbine power plant for aircraft. As will appear, however, the invention is of general application.

It is conventional practice to provide a screen for the air intake duct of an engine to prevent the entrance of foreign objects into said duct. In the case of aircraft engines, the condition of the engine intake air frequently is such that ice forms on any structure in said duct, such as said screen, over which said intake air flows. The presence of ice in the engine intake duct reduces or throttles the engine air flow therethrough thereby reducing the power output of the engine. An object of this invention comprises the provision of a novel and improved screen construction including means for heating all the elements of the screen to prevent the formation of ice thereon. In addition the invention has the further object of providing a novel screen construction offering only a small resistance to air flow therethrough.

Other objects of the invention will become apparent upon reading the annexed detailed description in connection with the drawing, in which:

Figure 1 is an end view of an annular air intake duct having a screen construction embodying the invention;

Figures 2 and 3 are sectional views taken along lines 2—2 and 3—3 of Figure 1;

Figure 4 is a sectional view taken along line 4—4 of Figure 3;

Figure 5 is an exploded perspective view of a portion of one of the struts illustrated in Figure 4; and Figure 6 is a schematic wiring diagram of the electric wires incorporated in the screen of the present invention.

Referring to the drawing, reference numeral 10 indicates the forward end of a gas turbine aircraft engine which comprises an air intake passage 12 having an annular outer wall 14 and an annular inner wall 16. The inner wall 16 is supported from the outer wall 14 by a plurality of circumferentially spaced and radially disposed struts 18 and a strut 18'. The strut 18' comprises the upper strut in Figure 1 and, except as hereinafter described, is identical with the struts 18.

The struts 18 and 18' are inclined to the axis of the annular passage 12 such that their radially outer ends are disposed downstream of their radially inner ends.

Each strut 18 has a composite construction which comprises a trailing edge member 20, a leading edge member 22, and a pair of comblike intermediate members 24 and 26. The intermediate comb-like members 24 and 26 are made of suitable electric insulating material while the leading edge member 22 and the trailing edge member 20 are made of suitable metallic material. The intermediate comb-like member 24 has a pair of longitudinal grooves 28 along its opposite sides within which inwardly turned tongues or flanges 30 of the trailing edge member 20 are arranged to be snugly and slidingly received. Each trailing edge member 20 also has a strengthening web 32. The radially spaced ends of each trailing edge member 20 are secured to the walls of the annular passage 12, for example by welds 34, either before or after said member and its associated comb-like member 24 are assembled together. If a trailing edge member 20 is first secured to the walls of the duct 12, then its intermediate member 24 may be assembled therewith by sliding said intermediate member radially inwardly along said trailing edge member with the flanges 30 received within the grooves 28. Each comb-like member 24 has a plurality of teeth 36 extending therefrom. After each trailing edge member 20 and its comb-like member 24 have been secured across the passage 12, a suitable electric resistance wire 38 is spirally wound across the passage, said wire being supported at the bottoms of the spaces between the teeth 36 of the members 24.

After the spiral resistance wire 38 is disposed in position on the comb-like member 24, the comb-like members 26 are assembled on their respective comb-like members 24. Thus, each comb-like member 26 has teeth 40 which are adapted to be snugly received within the inter-tooth spaces between the teeth 36 of the comb-like member 24. The teeth 40 are shorter than the teeth 36 thereby leaving passages across the ends of said short teeth, and the bottoms of their respective inter-tooth spaces, the wire 38 extending through said passages. The arrangement is such that the teeth 40 snugly hold the wire 38 against the bottoms of the inter-tooth spaces in the member 24.

When a pair of comb-like members 24 and 26 are disposed in assembled relation, notches 42 in both sides of the teeth 36 of the member 24 are aligned with corresponding notches 44 in both sides of the teeth 40 of the member 26. The leading edge member 22 is provided with inturned flanges 46 adapted to be slidingly received within said aligned notches 42 and 44 thereby securing the members 20, 22, 24 and 26 of a strut 18 together. Accordingly, each leading edge strut member 22 may be slid radially inwardly into position with its flanges 46 received in the grooves 42 and 44 of its associated comb-like members 24 and 26 respectively. The radially inner and outer ends of the leading edge members 22 are suitably secured to the walls of the passage 12, for example by welds 48. A suitable plate 49 is welded to and across the inner end of each leading edge member 22 so as to lock the members 20, 22, 24 and 26 of each strut against relative longitudinal movement.

The leading edge of each comb-like member 26 is provided with a longitudinal groove 50 along which a suitable insulated electric resistance wire 52 is adapted to be disposed. Obviously the wires 52 may be disposed in position either prior to, during, or after their respective leading edge members 22 are assembled in position.

The structure of the strut 18' is substantially the same as that of the struts 18 so that the parts of the strut 18' have been designated by similar but primed reference numerals as the corresponding parts of the struts 18. In the strut 18', the teeth 36' and 40', of the comb-like members 24' and 26', respectively, are inclined to the long dimension of the strut to facilitate the spiral configuration of the screen wire 38, as illustrated in Figure 1. Except for the inclined disposition of the teeth 36' and that of the mating teeth 40', the structure of the strut 18' is identical to that of the struts 18.

The outer wall 14 of the annular duct 12 has a hollow construction and a terminal box 54 is disposed therein over the strut 18'. A suitable source of electric energy is connected to a pair of terminals 56 and 58 in the box 54 by means of wires 60 and 62. As seen in Figures 1 and 6, one terminal 58 is connected to the outer end of the spiral resistance wire 38 and the other terminal 56 is connected to the outer end of the leading edge wire 52 of the strut 18'. The inner end of said spiral wire 38 is connected to one end of a jumper conductor 64, the other end of which connects with the inner end of the leading edge wire 52 of the adjacent clockwise-spaced strut 18, as viewed in Figure 1. The outer end of said last mentioned leading edge wire 52 connects with one end of a jumper conductor 66, the other end of which connects with the outer end of the next clockwise-spaced leading edge wire 52. In this way the jumpers 64 and 66 serially connect the leading edge wires 52 with the spiral wire 38.

The struts 18 and 18' together with the spiral wire 38 provide a screen construction disposed across the intake duct 12 to prevent the entrance of foreign objects therein. With this screen construction, when the conditions of the air entering the intake duct 12 are such that icing is or may occur inside said duct, then electric power is supplied to the terminals 56 and 58 through the wires 60 and 62. The resulting current flow through the leading edge wires 52 heats up the leading edges of the struts 18 and 18' of the screen to prevent the formation of ice on said struts. In addition the flow of current through the spiral wire 38 heats up this portion of the screen to prevent the formation of ice thereon. The amount of electric energy required to be supplied to the terminals 56 and 58 in order to prevent the formation of ice on the screen obviously depends on the quantity of air flowing through the duct 12 as well as on the temperature of said air.

If desired, it is possible to pass enough current through the screen wires to heat up the air flowing through the screen in order to also prevent ice formation downstream of the screen.

The composite structure of each strut with its comb-like members and leading and trailing edge members, provides a construction whereby the wire screen can readily be disposed across the duct 12 and supported from the struts. When the various members making up each strut are secured together, said struts all have a streamlined cross-section with only the inter-strut lengths of the spiral wire 38 projecting therefrom. The spiral wire 38 may also be provided with a streamlined cross-section. The struts 18 and 18' have the further function of supporting the inner wall 16 of the passage 12 from the outer wall 14 of said passage.

Because of the inclination of the struts 18 and 18', to the axis of the passage 12, there is only one turn of the spiral wire 38 in any plane transverse to the axis of the intake passage 12. That is, each turn of the spiral wire 38 is disposed in a plane which is axially spaced from the plane of any other turn of said wire. With this staggered disposition of the turns of the spiral wire 38, the screen formed thereby offers a much smaller resistance to air flow therethrough than would be the case if all the wire turns were disposed in the same plane.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A screen for an annular fluid duct comprising a plurality of struts extending between the inner and outer walls of said duct for supporting said inner wall, said struts being disposed so that the radially inner and outer ends of each strut are axially spaced relative to the axis of said duct; and a plurality of radially spaced lengths of electric wire extending between and carried by each pair of adjacent struts; and means for connecting said wires to a source of electric current.

2. A screen for an annular fluid duct comprising a plurality of struts extending between the inner and outer walls of said duct for supporting said inner wall, said struts being disposed so that the radially inner and outer ends of each strut are axially spaced relative to the axis of said duct; an electric wire carried by and disposed along the leading edge of each of said struts; and a plurality of radially spaced lengths of electric wire extending between and carried by each pair of adjacent struts; and means for connecting said wires to a source of electric current.

3. A screen for an annular fluid duct comprising a plurality of radially disposed struts extending between the inner and outer walls of said duct for supporting said inner wall; an electric wire carried by and disposed along the leading edge of each of said struts; and a plurality of radially spaced lengths of electric wire extending between and carried by each pair of adjacent struts; and means for connecting said wires to a source of electric current.

4. A screen as recited in claim 3 in which each of the wire lengths extending between a pair of adjacent struts is axially spaced, relative to the duct axis, from each of the other wire lengths between said pair of struts.

5. A screen as recited in claim 3 in which each of said struts includes a pair of comb-like members, each of said comb-like members having its teeth received within the inter-tooth spaces of its paired comb-like member, the teeth of one of said comb-like members being shorter than the teeth of the other of said members thereby forming passages between the ends of said short teeth and the bottoms of the inter-tooth spaces in which said short teeth are received, said lengths of wire being supported by said struts in said passages.

6. A screen as recited in claim 5 in which each of said comb-like members is made of electric insulating material.

7. A screen as recited in claim 3 in which each of said struts has a composite construction including a trailing edge member, a leading edge member and a pair of intermediate comb-like members secured to said first mentioned members, each of said comb-like members having its teeth received within the inter-tooth spaces of its paired comb-like member and the teeth of one of said comb-like members being shorter than the teeth of the other of said members thereby forming passages between the ends of said short teeth and the bottoms of the inter-tooth spaces in which said short teeth are received, said lengths of wire being supported by said struts in said passages.

8. A screen as recited in claim 7 in which each of said leading edge strut members has a flange received within grooves in each of its associated intermediate comb-like members for securing said members together.

CHARLES S. JEWETT.
ROBERT A. LOOS.
EUGENE A. MEHNERT.

REFERENCES CITED

The following references are of record in the file of this patent:

UNITED STATES PATENTS

| Number | Name | Date |
|---|---|---|
| 1,102,249 | Denhard | July 7, 1914 |
| 1,161,667 | Hays | Nov. 23, 1915 |
| 1,905,770 | Walker et al. | Apr. 25, 1933 |
| 2,260,233 | Ripley | Oct. 21, 1941 |
| 2,409,954 | Pearson | Oct. 22, 1946 |
| 2,435,990 | Weiler | Feb. 17, 1948 |